United States Patent
Puhala et al.

(10) Patent No.: US 7,559,348 B2
(45) Date of Patent: Jul. 14, 2009

(54) TIRE WITH RUBBER TREAD OF CIRCUMFERENTIAL ZONES WITH GRADUATED PHYSICAL PROPERTIES

(75) Inventors: Aaron Scott Puhala, Kent, OH (US); Michael Julian Crawford, Akron, OH (US); Leonard James Reiter, Norton, OH (US); Jeremy Elton Miracle, Wadsworth, OH (US); Martin Paul Cohen, Fairlawn, OH (US); Samuel Patrick Landers, North Canton, OH (US); David Charles Poling, Uniontown, OH (US); Robert Allen Losey, Kent, OH (US); Bernard Matthew Bezilla, Jr., Stow, OH (US); Donald Allan Abbott, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 428 days.

(21) Appl. No.: 11/043,495

(22) Filed: Jan. 26, 2005

(65) Prior Publication Data

US 2005/0167019 A1    Aug. 4, 2005

Related U.S. Application Data

(60) Provisional application No. 60/541,431, filed on Feb. 3, 2004.

(51) Int. Cl.
*B60C 1/00* (2006.01)
*B60C 11/00* (2006.01)

(52) U.S. Cl. ............ 152/209.4; 152/209.5; 152/209.18

(58) Field of Classification Search .............. 152/209.5, 152/209.4, 209.18
See application file for complete search history.

(56) References Cited

U.S. PATENT DOCUMENTS

| 4,385,653 | A | | 5/1983 | Okazaki et al. ............. 152/209 |
| 4,838,330 | A | * | 6/1989 | Takayama ................. 152/209.5 |
| 5,026,762 | A | * | 6/1991 | Kida et al. .................. 524/495 |

(Continued)

FOREIGN PATENT DOCUMENTS

DE    19812934    *    9/1999

(Continued)

OTHER PUBLICATIONS

Machine translation for Korea 364955 (May 2008).*

(Continued)

*Primary Examiner*—Steven D Maki
(74) *Attorney, Agent, or Firm*—Henry C. Young, Jr.

(57) ABSTRACT

The invention relates to a tire having a rubber tread comprised of cap/base construction where the tread cap layer provides the running surface of the tread and the tread base layer underlies the tread cap layer and thereby provides a transition between the tread cap layer and the tire carcass. For this invention, the tread cap layer is comprised of a plurality of individual circumferential load-bearing zones of rubber compositions, which exhibit graduated physical properties, and which extend from the outer running surface of the tread cap layer radially inward to said tread base layer. In one aspect, the zoned rubber tread cap layer and rubber tread base layer are co-extruded together to form a unit as an integral tread rubber composite.

27 Claims, 3 Drawing Sheets

U.S. PATENT DOCUMENTS

| | | | |
|---|---|---|---|
| 5,225,011 A | 7/1993 | Takino et al. | 152/209 |
| 5,937,926 A * | 8/1999 | Powell | 152/209.5 |
| 6,216,757 B1 * | 4/2001 | Ohara et al. | 152/209.7 |
| 6,474,382 B1 | 11/2002 | Finck | 152/209.5 |
| 6,523,585 B1 * | 2/2003 | Ducci et al. | 152/209.5 |
| 6,719,025 B2 | 4/2004 | Caretta et al. | 152/209.5 |
| 6,742,559 B2 * | 6/2004 | Iwamura | 152/209.5 |
| 2002/0033212 A1 | 3/2002 | Caretta et al. | 152/209.5 |
| 2004/0112490 A1 | 6/2004 | Sandstrom | 152/152.1 |
| 2004/0118495 A1 | 6/2004 | Sandstrom et al. | 152/209.5 |
| 2006/0102266 A1 * | 5/2006 | Ravasio et al. | 152/209.5 |
| 2006/0106143 A1 * | 5/2006 | Lin et al. | 524/493 |

FOREIGN PATENT DOCUMENTS

| | | |
|---|---|---|
| EP | 662396 | 7/1995 |
| EP | 839675 | 5/1998 |
| EP | 864446 | 9/1998 |
| EP | 904958 | 3/1999 |
| EP | 1048691 | 11/2000 |
| EP | 1308319 | 5/2003 |
| EP | 1431078 A1 | 6/2004 |
| JP | 02-249707 * | 10/1990 |
| JP | 06-009826 * | 1/1994 |
| JP | 2000-198322 * | 7/2000 |
| KR | 364955 * | 12/2002 |
| WO | 9901299 | 1/1999 |
| WO | 00/37270 | 6/2000 |
| WO | 0037270 | 6/2000 |

OTHER PUBLICATIONS

Japanese Patent Abstract for Publication No. 60135309, Published Jul. 18, 1985.4.

European Search Report completed Jul. 11, 2008.

* cited by examiner

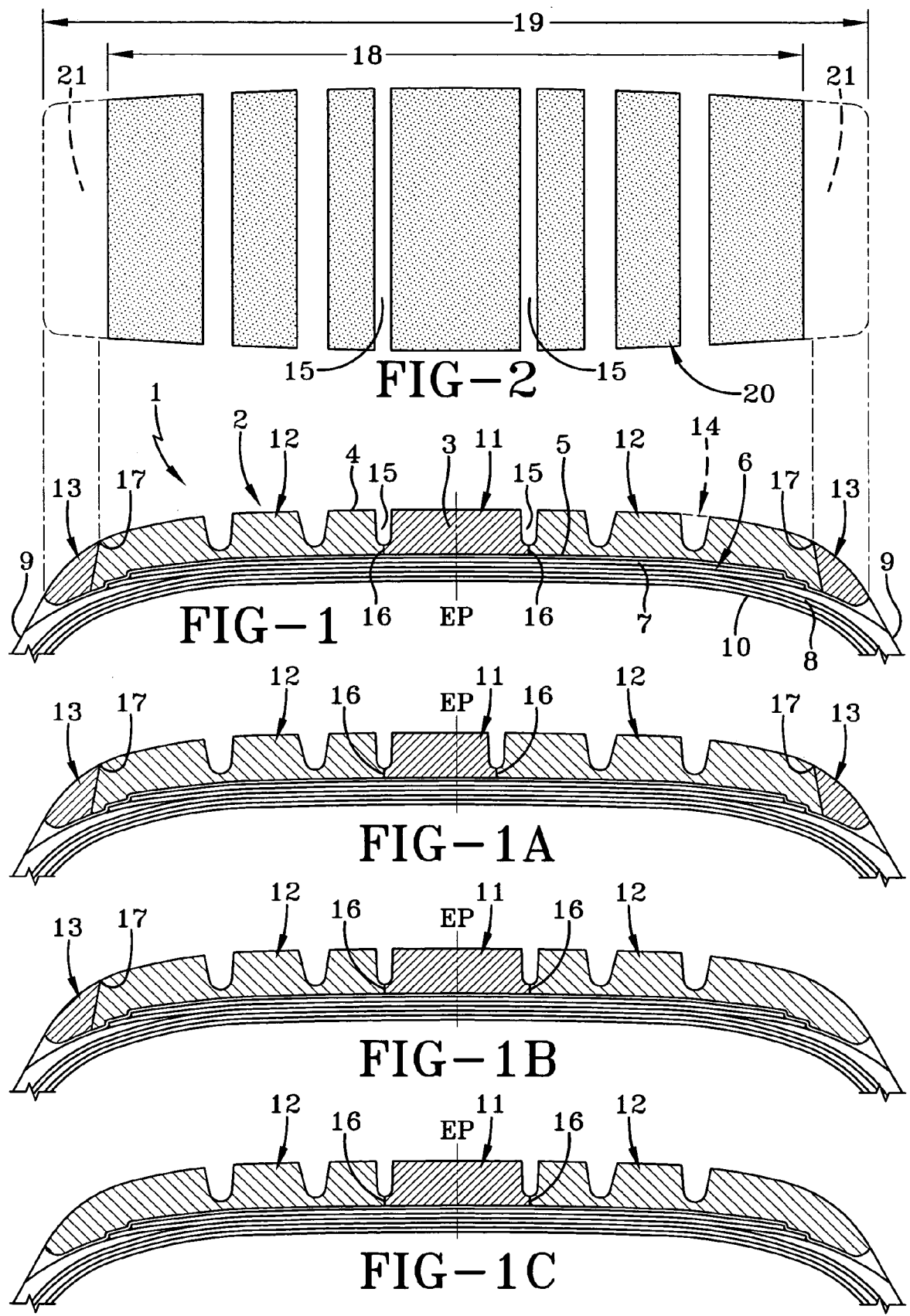

TIRE WITH RUBBER TREAD OF CIRCUMFERENTIAL ZONES WITH GRADUATED PHYSICAL PROPERTIES

The Applicants hereby claim the benefit of prior U.S. Provisional Application Ser. No. 60/541,431, filed on Feb. 3, 2004.

FIELD OF THE INVENTION

The invention relates to a tire having a rubber tread comprised of cap/base construction where the tread cap layer provides the running surface of the tread and the tread base layer underlies the tread cap layer and thereby provides a transition between the tread cap layer and the tire carcass. For this invention, the tread cap layer is comprised of a plurality of individual circumferential load-bearing zones of rubber compositions, which exhibit graduated physical properties, and which extend from the outer running surface of the tread cap layer radially inward to said tread base layer. In one aspect, the zoned rubber tread cap layer and rubber tread base layer are co-extruded together to form a unit as an integral tread rubber composite.

BACKGROUND FOR THE INVENTION

Tire treads for pneumatic tires typically have running surfaces of a singular rubber composition and consistent physical properties across the face of the tread intended to be ground contacting.

Often the tire tread may be of a cap/base construction composed of an outer tread cap layer presenting the running surface of the tire and an underlying tread base layer as a transition between the tread cap layer and the tire carcass. The tread cap layer itself may be of a lug and groove configuration with the outer surface of the lugs, including lugs in a from of ribs, themselves presenting the running surface of the tire tread. Such overall tire tread cap/base construction is well known to those having skill in such art.

For example, an all-season tire tread cap layer may be of an individual rubber composition designed to present a tread running surface for a balance of a combination of wet traction, cold weather winter traction (for snow and/or ice), dry handling, and resistance to tread wear properties.

However, optimizing one or more individual tread properties such as, for example, wet traction, cold weather winter traction, dry handling and resistance to tread wear properties typically requires a compromise of one or more physical properties.

Accordingly, for this invention, it is desired to present an outer tread cap layer with a running surface comprised of a plurality of individual circumferential load-bearing zones which exhibit one or more graduated physical properties, and which extend from the outer running surface of the tread cap layer radially inward to said tread base layer.

In practice, at least one, and preferably two primary tread cap zones are provided which constitute at least half of the tread running surface intended to be ground contacting. The remainder of such tread running surface is comprised of at least one and preferably at least two supplemental tread cap zones. The supplemental tread cap zone(s) are comprised of one or two lateral tread cap zones individually positioned axially outward of said primary tread cap zone(s) and/or a central tread cap zone wherein such central tread cap zone divides said primary tread cap zone into two primary tread cap zones.

For a symmetric tire tread cap, the tread cap may be comprised of the primary tread cap zone(s) and supplementary tread cap zone(s) as two lateral tread cap zones of substantially equal widths and/or a central tread cap zone.

For an asymmetric tire tread, at least one of said supplemental lateral tread cap zones may be provided of unequal widths in the case of two lateral tread cap zones and/or at least one of said primary tread cap zones may be provided of unequal widths in the case of two primary tread cap zones with a supplemental central tread cap therebetween. Accordingly, in such case, the central tread cap zone may not be centered over the centerline (the equatorial plane) and thereby may be in an off-centered position.

The rubber compositions of the strategically positioned rubber tread cap zones of the tread cap layer present a cooperative combination of graduated physical properties across the running surface of the tire in a sense of dynamic storage moduli (G') at +60° C. and G' at −25° C. and dynamic loss modulus (G") at 0° C. for the individual tread cap zone rubber compositions.

In particular, the optional supplemental central tread cap zone has a dynamic storage modulus (G') at −25° C. which is less than the storage modulus (G') at −25° C. of said primary tread cap zone(s). A tire tread cap running surface is thereby presented where the optional central tread cap zone presents a tread cap running surface which is thereby relatively less stiff (e.g. somewhat softer) at lower temperatures than the associated primary tread cap zones to promote an accommodation of the tread for winter (snow and/or ice) driving conditions.

The supplemental lateral tread cap zone(s) have a storage modulus (G') at 60° C. which is greater than the storage modulus (G') at 60° C. of said primary tread cap zone(s). A tire tread cap running surface is thereby presented comprised of zones in which the lateral tread cap zone(s) are relatively stiffer at a 60° C. temperature than the associated primary tread cap zone(s) to promote an accommodation of the tread for non-winter driving conditions.

In practice, the lateral tread cap zone(s) have a loss modulus (G") at 0° C. property which is greater than such loss modulus (G") at 0° C. property of the said primary tread cap zone(s) to promote wet traction and wet handling.

It is therefore considered herein that it is a significant aspect of the invention for a tire tread cap layer comprised of said primary tread cap zone(s) and at least one supplemental tread cap zones (e.g. central and/or lateral tread cap zones), that the aforesaid storage moduli G' (at −25° C.) and G' (at 60° C.) and loss modulus G" (at 0° C.) physical properties relating to the said tread cap layer zones are combined in a cooperative manner to provide the overall tread running surface with suitable gradations of physical properties relating to the aforesaid wet traction, cold weather winter traction and/or non-winter handling.

Historically, tire treads have heretofore been suggested having running surfaces composed of three longitudinal portions namely, two black colored lateral portions and a non-black colored central portion located between the two black portions, wherein the lateral black colored portions have wear resistant properties virtually identical to the central colored portion (EP 0 993 381 A3, FR 2765525 and WO 99/01299 patent publications). It is considered herein that such revelation does not teach or suggest the strategically positioned and physical property gradation based tire tread cap zones of the present invention.

In U.S. Pat. No. 5,225,011 a tire is presented having a tread composed of a center rubber composition and side rubbers (its FIG. 1) positioned directly onto a tire carcass belt without a tread base transition layer. The center rubber is required to be limited to either natural rubber or a natural rubber/styrene-butadiene rubber blend. The center rubber contains a carbon black of large iodine absorption number of at least 100 mg/g, silica and silane coupling agent and the side rubbers are required to be of a different rubber composition. It is considered herein that such revelation does not teach or suggest the strategically positioned and physical property gradation based tire tread cap zones of the present invention.

In European patent publication number EP 864,446 A1 a tire is presented having a tread (its FIG. 2) with a central portion (B) and side portions (A) positioned directly onto a tire carcass belt without a tread base transition layer. The side portions are carbon black rich and the central portion is silica rich, wherein the silica content of the central portion (B) is at least 20 percent higher than in the side portions (A). It is considered herein that such revelation does not teach or suggest the strategically positioned and physical property gradation based tire tread cap zones of the present invention.

For the zoned tread cap layer of this invention, by requiring the tread cap zones to be capable of being load-bearing, it is meant that each of the distinct tread running surface tread cap zones extend radially inward from the outer surface of the tread cap layer to the underlying tread base layer rubber composition so that the load on the tire may be communicated by the tread cap layer zones to the transitional tread base layer instead of directly to remainder of the tire carcass itself.

In one aspect of this invention, the running surfaces of said optional supplemental central and said primary tread cap zone(s) are normally ground-contacting and the running surfaces of said optional, supplemental one or two, preferably two, tread cap zone(s) may preferably positioned to be ground contacting only during cornering conditions and, although continuing to be a part of the total running surface of the tire tread cap layer, would, in such case, be considered herein as being intermittently ground-contacting.

The term "running surface", or "total running surface", of the tread cap layer, unless otherwise indicated, means the total outer surface of such tread cap layer which is intended to be ground-contacting, including such outer surface of the tread cap layer which is intended to intermittently ground-contacting and the included space across the opening of any tread grooves contained in such tread cap layer at the running surface level. When a tread cap zone is referenced herein as spanning a percentage of total running surface of the tread cap, unless otherwise indicated, such span extends axially, or laterally, across such running surface (e.g. basically, in a direction substantially perpendicular to the equatorial plane of the tire).

In the description of this invention, the terms "rubber" and "elastomer" where herein, are used interchangeably, unless otherwise provided. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art. The terms "cure" and "vulcanize" may be used interchangeably unless otherwise provided. In the description of this invention, the term "phr" refers to parts of a respective material per 100 parts by weight of rubber, or elastomer.

The dynamic storage moduli (G') and dynamic loss modulus (G") viscoelastic properties of a cured rubber composition or tread sample are obtained using a ARES™-LS2 rheometer from the TA Instruments company of New Castle, Del. (USA) and equipped with a liquid nitrogen cooling device and forced convection oven to allow testing of rubber samples over a broad temperature range below and above ambient temperature. A cylindrical cured rubber sample is used which is approximately 8 millimeters in diameter and approximately 2 millimeters in height glued between two brass cylinders of approximately 8 millimeters in diameter. Such glue may, for example, be a cyanoacrylate based glue. The Orchestrator™ software was used to control the ARES™-LS2 rheometer. Using said software, the temperature increase rate of 5° C. is set. A temperature sweep at 3 percent torsional strain and 10 Hertz frequency of from, for example, about −30° C. to about +60° C. is used in which the dynamic storage moduli (G') and dynamic loss modulus (G") values may be determined simultaneously over said temperature range. From said determined dynamic storage moduli (G'), observations are made at −25° C. and +60° C. and from said determined loss moduli (G"), observations are made at 0° C. Use of dynamic storage modulus (G') and dynamic loss modulus (G") viscoelastic properties to characterize various aspects of cured rubber compositions is well known to those having skill in such art.

SUMMARY AND PRACTICE OF THE INVENTION

In accordance with this invention, a tire is provided having a rubber tread of a cap/base construction comprised of an outer rubber tread cap layer containing an outer running surface and an underlying rubber tread base layer, wherein said tread cap layer is comprised of a plurality of circumferential, longitudinal rubber tread cap zones of graduated physical properties, wherein said tread cap zones individually extend from said tread cap running surface radially inward to said tread base layer:

wherein said tread cap zones are comprised of:
  (A) a primary tread cap zone and two lateral tread cap zones; wherein said lateral tread cap zones are of substantially equal widths, wherein said primary tread cap zone spans at least 50 percent of the total running surface of said tire tread cap layer and wherein said two lateral tread cap zones collectively span at least 5 percent of the total running surface of said tire tread cap layer and are individually positioned axially outward from said primary tread cap zone, or
  (B) two primary tread cap zones, one central tread cap zone and two lateral tread cap zones; wherein said central tread cap zone is positioned between said primary tread cap zones and spans at least 5 percent of the total running surface of the tread cap layer, wherein said primary tread cap zones are of substantially equal widths and collectively span at least 50 percent of the total running surface of the tread cap layer, wherein said lateral tread cap zones are of substantially equal widths, span at least 5 percent of the total running surface of the tread cap layer and are individually positioned axially outward from said primary tread cap zone, or
  (C) one primary tread cap zone and one lateral tread cap zone; wherein said primary tread cap zone spans at least 50 percent of the total running surface of said tread cap layer, and wherein said lateral tread cap zone spans at least 5 percent of the total running surface of said tread cap layer and is positioned axially outward from said primary tread cap zone, or
  (D) two primary tread cap zones, one central tread cap zone and two lateral tread cap zones; wherein said primary tread cap zones are of unequal widths and collectively span at least 50 percent of the total running surface of the tread cap layer, wherein said central tread cap zone is positioned between said primary tread cap zones and span at least 5 percent of the total running surface of said tire tread cap layer and wherein said two lateral tread cap zones are of substantially equal widths and collectively span at least 5 percent of the total running surface of said tire tread cap layer and are individually positioned axially outward from said primary tread cap zones, or (E) two primary tread cap zones, one central tread cap zone and two lateral tread cap zones; wherein said primary tread cap zones are of substantially equal widths and collectively span at least 50 percent of the total running surface of the tread cap layer, wherein said central tread cap zone is positioned between said primary tread cap zones and span at least 5 percent of the total running surface of the tread cap layer and wherein said two lateral tread cap zones are of unequal widths collectively spanning at least 5 percent of the total running surface of said tire tread cap layer and each individually positioned axially outward from said primary tread cap zones, or (F) two primary tread cap zones and one central tread cap zone; wherein said primary tread cap zones are of substantially equal widths and span at least 50 percent of the total running surface of the tread cap layer and wherein said central tread cap zone is positioned between said primary tread cap zones and spans at least 5 percent of the total running surface of said tire tread, or (G) two primary tread cap zones, and one central tread cap zone; wherein said primary tread cap zones are of unequal widths and collectively span at least 50 percent of the total running surface of the tread cap layer and said central tread cap zone is positioned between said primary tread cap zones and spans at least 5 percent of the total running surface of said tire tread cap, or (H) two primary tread cap zones, one central tread cap zone and one lateral tread cap zone; wherein primary tread cap zones are of unequal widths and collectively span at least 50 percent of the total running surface of the tire tread cap layer, wherein said central tread cap zone is positioned between said primary tread cap zones and spans at least 5 percent of the total running surface of said tread cap layer, and wherein said lateral tread cap zone spans at least 5 percent of the total running surface of said tire tread cap layer and is positioned axially outward from one of said primary tread cap zones;

wherein, the viscoelastic properties of said individual tread cap zones are comprised of:

(1) viscoelastic properties comprised of:
  (a) the dynamic storage modulus (G') at 60° C., 3 percent strain and 10 Hertz of said lateral tread cap lateral zone(s) is at least 0.5 MPa greater than such storage modulus (G') at 60° C. of said primary tread cap zone(s) and such storage modulus (G') at 60° C. of said central tread cap zone is at least 0.5 MPa greater than such storage modulus (G') at 60° C. of said primary tread cap zone(s); and
  (b) the dynamic storage modulus (G') at −25° C., 3 percent strain and 10 Hertz of said central tread cap is at least 5 MPa less than such storage modulus (G') at −25° C. of said primary tread cap zone(s); and
  (c) the dynamic loss modulus (G") at 0° C., 3 percent strain and 10 Hertz of said lateral tread cap zone(s) is at least 1 MPa greater than such loss modulus (G") at 0° C. of said primary tread cap zone(s); or (2) viscoelastic properties comprised of:
  (a) a dynamic storage modulus (G') at 60° C., 3 percent strain and 10 Hertz for said primary tread cap zone(s) in a range of from about 0.5 to about 5 MPa, such storage modulus (G'), (at 60° C.), for said central tread cap zone in a range of from about 1 to about 6 MPa and such storage modulus (G'), (at 60° C.), for said lateral tread cap zone(s) in a range of from about 1 to about 6 MPa; provided however that such storage modulus (G') (at 60° C.) of said lateral tread cap zone(s) and said central tread cap zone is greater than such storage modulus (G') (at 60° C.) of said primary tread cap zone(s); and
  (b) a dynamic storage modulus (G') at −25° C., 3 percent strain and 10 Hertz for said primary tread cap zone(s) in a range of from about 10 to about 300 MPa, such storage modulus (G'), (at −25° C.), for said central tread cap zone in a range of from about 2 to about 295 MPa and such storage modulus (G'), (at −25° C.), of said lateral tread cap zone(s) in a range of from about 10 to about 350 MPa; provided however that such storage modulus (G'), (at −25° C.) of said central tread cap zone is less than such storage modulus (G'), (at −25° C.) of said primary tread cap zone(s); and
  (c) a dynamic loss modulus (G") at 0° C., 3 percent strain and 10 Hertz for said primary tread cap zone(s) in a range of from about 0.5 to about 20 MPa, such loss modulus (G"), (at 0° C.), for said central tread cap zone in a range of from about 0.5 to about 20 MPa such loss modulus (G"), (at 0° C.), for said lateral tread cap zone(s) in a range of from about 1.5 to about 30 MPa; provided however that such loss modulus (G"), (at 0° C.), of the rubber composition of said lateral tread cap zone(s) is greater than such loss modulus (G"), (at 0° C.), of said primary tread cap zone(s); or (3) viscoelastic properties comprised of:
  (a) dynamic storage modulus (G') at 60° C., 3 percent strain and 10 Hertz for said primary tread cap zone(s) in a range of from about 0.5 to about 2 MPa, such storage modulus (G'), (at 60° C.), for said central tread cap zone in a range of from about 1 to about 3 MPa and such storage modulus (G') (at 60° C.) for said lateral tread cap zone(s) in a range of from about 1 to about 3 MPa; provided however that the storage modulus (G'), (at 60° C.), of said lateral tread cap zone(s) is at least 0.5 MPa greater than such storage modulus (G'), (at 60° C.), of the primary and central tread cap zones and the storage modulus (G'), (at 60° C.), of said central tread cap zone is at least 0.5 MPa greater than such storage modulus (G'), (at 60° C.), of the primary tread cap zone;
  (b) a dynamic storage modulus (G') at −25° C., 3 percent strain and 10 Hertz for said primary tread cap zone(s) in a range of from about 10 to about 30 MPa, such storage modulus (G'), (at −25° C.), for said central tread cap zone in a range of from about 2 to about 25 MPa and such storage modulus (G'), (at −25° C.), for said lateral tread cap zone(s) in a range of from about 10 to about 50 MPa; provided however that such storage modulus (G'), (at −25° C.), of the rubber composition of said central tread cap zone is at least 5 MPa less than such storage modulus (G'), (at −25° C.), of the primary tread cap zone(s); and
  (c) a dynamic loss modulus (G') at 0° C., 3 percent strain and 10 Hertz of said primary tread cap zone(s) in a range of from about 0.5 to about 3 MPa, such loss modulus (G'), (at 0° C.), for said central tread cap zone in a range of from about 0.5 to about 3 MPa and such loss modulus (G'), (at 0° C.), for said lateral tread cap zone(s) in a range of from about 1.5 to about 4 MPa; provided however that such loss modulus (G'), (at 0C), of said lateral tread cap zone(s) is at least 1 MPa greater than such loss modulus (G'), (at 0° C.), of said primary tread cap zone(s), or (4) viscoelastic properties comprised of:
  (a) a dynamic storage modulus (G') at 60° C., 3 percent strain and 10 Hertz for said primary tread cap zones in a range of from about 1.5 to about 4 MPa, such storage modulus (G'), (at 60° C.), for said central tread cap zone in a range of from about 2 to about 5 MPa and such storage modulus (G'), (at 60° C.), for said lateral tread cap zone(s) in a range of from about 2 to about 5 MPa; provided however that the storage modulus (G'), (at 60° C.), of said lateral tread cap zones is at least 0.5 MPa greater than such storage modulus (G'), (at 60° C.), of said primary tread cap zone(s) and such storage modulus (G'), (at 60° C.), of said central tread cap zone is at least 0.5 MPa greater than such storage modulus (G'), (at 60° C.), of said primary tread cap zone(s);
  (b) a dynamic storage modulus (G') at −25° C., 3 percent strain and 10 Hertz for said primary tread cap zone(s) in a range of from about 20 to about 50 MPa, such storage modulus (G'), (at −25° C.), for said central tread cap zone in a range of from about 5 to about 45 MPa and such storage modulus (G'), (at −25° C.), for said lateral tread cap zone(s) in a range of from about 20 to about 100 MPa; provided however that such storage modulus (G'), (at −25° C.), of said central tread cap zone is at least 5 MPa less than such storage modulus (G'), (at −25° C.), of said primary tread cap zone(s); and
  (c) a dynamic loss modulus (G') at 0° C., 3 percent strain and 10 Hertz for said primary tread cap zone(s) in a range of from about 1 to about 4 MPa, such loss modulus (G'), (at 0° C.), for said central tread cap zone in a range of from about 1 to about 4 MPa and such loss modulus (G'), (at 0° C.), for said lateral tread cap zone(s) in a range of from about 2 to about 15 MPa; provided however that such loss modulus (G'), (at 0° C.), of said lateral tread cap zone(s) is at least 1 MPa greater than such loss modulus (G'), (at 0° C.), of said primary tread cap zone(s), or (5) viscoelastic properties comprised of:
  (a) a dynamic storage modulus (G') at 60° C., 3 percent strain and 10 Hertz for said primary tread cap zone(s) in a range of from about 2 to about 5 MPa, such storage modulus (G'), (at 60° C.), for said central tread cap zone in a range of from about 2.5 to about 6 MPa and such storage modulus (G'), (at 60° C.), for said lateral tread cap zone(s) in a range of from about 2.5 to about 6 MPa; provided however that the storage modulus (G'), (at 60° C.), of said lateral tread cap zone(s) is at least 0.5 MPa greater than such storage modulus (G'), (at 60° C.), of said primary tread cap zone(s) and such storage modulus (G'), (at 60° C.), of the rubber composition of said central tread cap zone is at least 0.5 MPa greater than such storage modulus (G'), (at 60° C.), of said primary tread cap zone(s);
  (b) a dynamic storage modulus (G') at −25° C., 3 percent strain and 10 Hertz for said primary tread cap zone(s) in a range of from about 35 to about 300 MPa, such storage modulus (G'), (at −25° C.), for said central tread cap zone in a range of from about 30 to about 295 MPa and such storage modulus (G'), (at −25° C.), for said lateral tread cap zone(s) in a range of from about 35 to about 350 MPa; provided however that such storage modulus (G'), (at −25° C.), of said central tread cap zone is at least 5 MPa less than such storage modulus (G'), ( at −25° C.), of said primary tread cap zone(s); and
  (c) a dynamic loss modulus (G') at 0° C., 3 percent strain and 10 Hertz for said primary tread cap zone(s) in a range of from about 2 to about 20 MPa, such loss modulus (G'), at 0° C., for said central tread cap zone in a range of from about 2 to about 20 MPa and such loss modulus (G'), (at 0° C.), for said lateral tread cap zone(s) in a range of from about 3 to about 30 MPa; provided however that such loss modulus (G'), (at 0° C.), of said lateral tread cap zone(s) is at least 1 MPa greater than such loss modulus (G'), (at 0° C.), of said primary tread cap zone(s).

In practice, the individual rubber compositions of the respective zones of said zoned tread cap layer, together with said tread base rubber layer, are preferably co-extruded together to provide an integral, extruded, tread component of the tire. Such integral extruded zoned tread component may, for example, be in a form of three or four individual rubber compositions comprising a plurality of from three to six, preferably 5 or 6, extruded components of the tread, namely a rubber composition for said optional central tread cap zone, a rubber composition for said primary tread cap zone(s), a rubber composition for said optional one or two lateral tread cap zones, and a rubber composition for said tread base layer.

It is to be appreciated that one or more of said circumferential, longitudinal tread cap zones may be subdivided into sub zones of rubber compositions having variations of said storage moduli (G') and loss modulus (G') within said ranges for said respective tread cap zones although such sub division is not a preferred aspect of the invention.

In one aspect of the invention, the junctions of said central and primary tread cap zones are positioned within circumferential grooves located between said zones.

In one aspect of the invention, the junctions of said primary and lateral tread cap zones are positioned axially outward of a free rolling footprint of the tire.

In one aspect of the invention where one or more of said lateral tread cap zones are not positioned axially outward of a free rolling footprint of the tire, the junctions of said primary and said lateral tread cap zone(s) are positioned within circumferential grooves located between said zones.

The central tread cap zone with the indicated storage modulus (G') at −25° C. values of its rubber composition, combined with its lower loss modulus (G') at 0C. than that of the rubber composition of said primary tread cap zones, is intended to promote traction for the tread running surface under winter driving conditions (e.g. snow and/or ice) while, because of its associated dynamic storage modulus (G') at 60° C., it remains suitable for a tread running surface over a broad range of road surfaces other than winter driving conditions.

The lateral tread cap zone(s) with the indicated dynamic storage modulus (G') at 60° C. and dynamic loss modulus (G') at 0° C. values for its rubber composition, is intended to promote enhanced handling of the tire, particularly when cornering, over a broad range of conditions.

Accordingly, the invention presents a tire tread comprised of a plurality of circumferential tread cap zones with a strategically positionally graduated combination of physical properties which depend upon a combination of said viscoelastic properties of said dynamic storage moduli (G') at both 60° C. and −25° C. and dynamic loss modulus (G') at 0° C.

As previously discussed, the invention is directed to a tire tread of a cooperative combination of a cap/base structural configuration wherein the outer tread cap layer provides a tire running surface which is divided into a plurality of individual and strategically positioned zones which present varied and graduated physical properties.

This is a significant contrast to providing a tire tread, particularly a tread cap of a tread of cap/base construction, of a unitary tread running surface. As hereinbefore discussed, a significant difficulty of providing such a unitary tread running surface relates to compromises in providing such a tread surface with physical properties suitable for traction and/or handling over broad range of driving conditions. By the practice of this invention of strategic positioning selective tread cap zones of graduated physical properties across the face of the running surface of the tire tread, such compromises are both minimized and the otherwise compromised physical limitations of selected regions of the tread running surface are advantageously emphasized insofar as traction and handling characteristics of the tire over a relatively wide range of conditions.

In one aspect of the invention, the running surface of said lateral tread cap zones may be, optionally and preferably, positioned axially outward of the normal free rolling footprint of the tire when inflated and running under 75 percent of its rated load and are thereby intended to be ground-contacting normally only under cornering conditions. Such positioned lateral tread cap zones are thereby only intermittently presented as an active running surface of tire tread of a properly inflated and loaded tire. The normal free rolling footprint of the tire is an aspect well known to those having skill in such art and relates to the footprint of the tire on a surface (e.g. the ground, road or other surface) over which the tire is rolling. As the tire begins to corner, even under a mild cornering condition such as for example as might be experienced by front tires of a vehicle as it turns a corner at a low rate speed, it is contemplated that at least a portion of the running surface of such positioned lateral tread zone contacts the road and to thereby enhance the cornering grip of the tire on the road. The rated load for a respective tire may be found, for example, in a yearbook of *The Tire and Rim Association, Inc.* having a current address at 175 Montrose West, Ave., Suite 150, Copley, Ohio 44321, U.S.A. when using a tire inflation pressure recommended by the respective vehicle manufacturer for that tire on its vehicle. For example, for a tire of size P225/60R16 where a vehicle manufacturer recommends a tire inflation pressure of 35 psi, (241 kPa) for the tire, the 2002 yearbook of The Tire & Rim Association, Inc on its page 1-18 recites a Standard Load for that tire of 1,609 pounds (730 kg). Accordingly, 75 percent of such Standard Load for that tire on that vehicle would be 1207 pounds (548 kg). Other publications reciting standard loads for respective tires are those published by an "ETRTO" organization (Europe) and an "JATMA" organization (Japan). For this invention, should differences arise in specified Standard Load values for a respective tire for a respective vehicle, the Standard Load values presented by The Tire and Rim Association, Inc. should be relied upon.

In one aspect of the invention, based upon parts by weight per 100 parts by weight of rubber (phr), the rubber compositions of said primary tread cap zones, central tread cap zone and said lateral tread cap zone(s) contain, provided however that such rubber compositions have the said dynamic storage moduli (G') at both −25° C. and 60° C. and dynamic loss modulus (G') at 0° C. viscoelastic physical properties for the respective tread cap zones, (A) 100 phr of at least one, alternately at least two, conjugated diene-based elastomers;

(B) about 40 to about 100, alternately about 40 to about 90, phr of carbon black and precipitated silica reinforcement comprised of, (1) about zero to about 100, alternately from about 5 to about 80, phr of rubber reinforcing carbon black, and (2) about zero to about 80, alternately about 10 to about 85, phr of precipitated silica; and (C) coupling agent for said silica having a moiety reactive with hydroxyl groups (e.g. silanol groups) contained on the surface of said precipitated silica another moiety interactive with diene-based elastomers.

It is considered herein that such rubber compositions with said viscoelastic properties can be obtained with routine development by one having skill in such rubber compounding art without undue experimentation.

In one alternative aspect of the invention, one or more of said individual tread cap zone rubber compositions, particularly said optional central tread cap zone rubber composition, may contain from about 1 to about 15, alternately about 2 to about 10, phr of short fibers selected from, for example, at least one of glass, polyester, nylon, aramid, carbon, rayon and cotton fibers, preferably glass fibers. Such short fibers may have an average diameter, for example, in a range of from about 10 to about 50 microns and an average length, for example, in a range of from about 0.5 to about 5 mm.

In one alternative aspect of the invention, one or more of said individual tread cap zone rubber compositions, particularly said optional central tread cap zone rubber composition, may contain from about 1 to about 5, alternately about 1 to about 4, phr of particulate inorganic or organic granules, in addition to said rubber reinforcing carbon black and said precipitated silica, having an average diameter considerably larger than the typical average diameter of said rubber reinforcing carbon black and precipitated silica in a range, for example, of from about 50 to about 200 microns. Representative of such particulate granules are, for example and not intended to be limiting, particulate inorganic minerals, particulate agricultural plant-derived particles, engineered (manufactured) organic and inorganic polymeric particles. Such particulate materials may be, for example, and not intended to be limiting, ground nut shells, hollow glass spheres, ground nylon, aramid and polyester polymers, and ground inorganic mineral composites such as for example aluminum silicate (pumice).

In practice, said tread base rubber layer is typically of a single rubber composition comprised of at least one conjugated diene-based elastomer. For example, the tread base rubber layer may be comprised of at least one conjugated diene-based elastomer and from about 30 to about 70 phr of rubber reinforcing filler selected from carbon black or a combination of and precipitated silica and carbon black comprised of from about 30 to about 70, alternately from about 25 to about 65, phr of carbon black and from zero to 25, alternately about 5 to about 20, phr of precipitated silica, (thus, in one aspect, the rubber reinforcing filler may be, and in general is preferably, entirely rubber reinforcing carbon black).

Representative examples of conjugated diene-based elastomers for said tread base rubber layer are, for example, cis 1,4-polyisoprene rubber (usually preferably natural rubber) which may, if desired, be used in combination with another diene based elastomer such as for example, cis 1,4-polybutadiene rubber and/or isoprene/butadiene rubber.

In practice, representative examples of conjugated diene-based elastomers for said rubber compositions of said central, primary and lateral tread cap zone(s), provided that such rubber compositions present the required dynamic storage moduli (G') at −25° C. and 60° C. and dynamic loss modulus (G') at 0° C., are, for example and based upon parts by weight per parts by weight rubber (phr):

(A) from zero to about 100, alternately about 25 to about 100, and alternately from about 50 to about 75, phr of styrene/butadiene copolymer elastomer having a Tg in a range of from about −80° C. to about −10° C., (depending somewhat upon its bound styrene content and vinyl content of its butadiene component and whether is produced by organic solvent solution polymerization or by aqueous emulsion polymerization of styrene and 1,3-butadiene monomers);

(B) from zero to about 80, alternately about zero to about 75, and alternately about 25 to about 50, phr of cis 1,4-polybutadiene rubber having a Tg in a range of from about −95° C. to about −110° C., preferably having a cis 1,4-content of at least 95 percent; and (C) from zero to about 40, alternately about zero to about 25, phr of at least one additional diene-based elastomer having a Tg in a range of from about −10° C. to about −100° C.

Said additional diene-based rubber may be comprised of, for example, at least one of cis 1,4-polyisoprene rubber, isoprene/butadiene rubber, trans 1,4-polybutadiene, low vinyl polybutadiene having vinyl content in a range of 5 to about 20 percent, high vinyl polybutadiene having a vinyl content in a range of from about 20 to about 90 percent, 3,4-polyisoprene, and styrene/isoprene/butadiene rubber In practice, for a relatively symmetrically zoned tread cap, said primary tread cap zones may be of equal widths, or at least substantially equal widths and for a relatively asymmetrically zoned tread cap said primary tread cap zones may be of significantly unequal widths with the width of one primary tread cap zone ranging, for example from about 105 to about 150 percent of the width of the other.

In practice, said optional central tread cap zone is, in general, centered on the running surface of the tread cap layer, (e.g. centered on the equatorial plane of the tire) particularly for a symmetrically zoned tread cap. For an asymmetrically zoned tread cap, said central tread cap zone may be positioned somewhat off-center of the running surface of the tread cap layer, particularly where the said primary tread cap zones are of significantly different widths.

As hereinbefore discussed, an aspect of the invention is the inclusion of the respective tread cap zones within the rubber tread cap layer itself with the underlying and co-extruded rubber tread base itself being of a singular rubber composition and not composed of a plurality of individual zones. Thus, the individual circumferential load bearing tread cap zones extend radially inward from the tread cap running surface to the underlying, and supportive, transitional, tread base layer in contrast to extending directly to the tire carcass.

BRIEF DESCRIPTION OF THE DRAWINGS

For a further understanding of the invention, drawings are provided. In particular, FIG. 1 (FIG. 1), as well as FIG. 1-A, FIG. 1-B and FIG. 1-C, are provided as depicting a partial cross-sectional view of a cap/base configured tread portion of a pneumatic tire.

FIG. 2 is presented as depicting a tire tread footprint of the tire tread of FIG. 1 for a purpose of illustrating a combination of free rolling footprint portion which would normally be intended to be generated by a ground-contacting portion of a tire running surface, together with an axial extension of the free rolling footprint which may be intermittently ground-contacting under tire cornering conditions.

THE DRAWINGS

Figure 3:
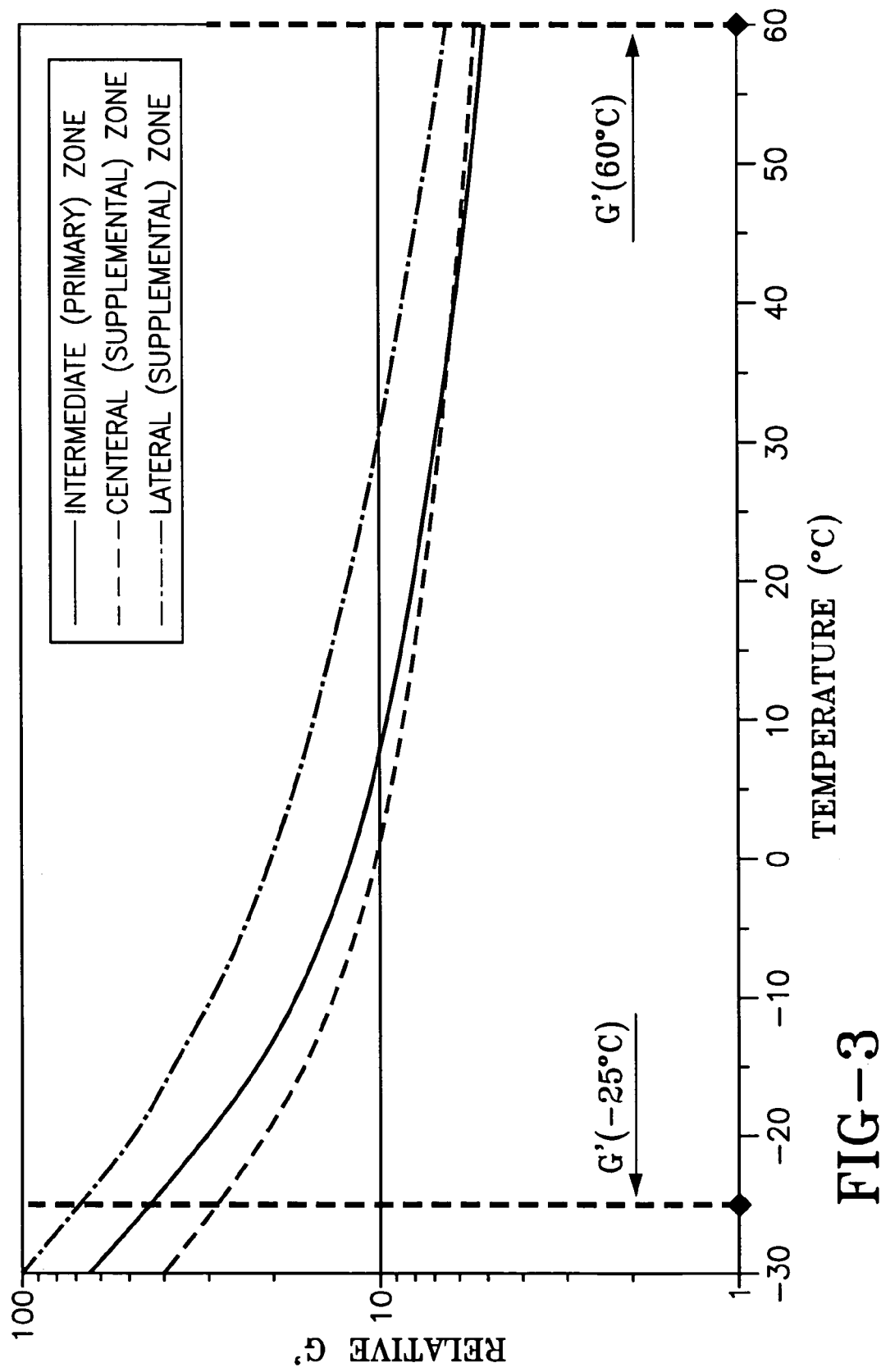
FIG. 3 is a graphical presentation of temperature sweep for dynamic storage modulus (G') values and FIG. 4 is presented as depicting a temperature sweep of loss modulus (G') values.

FIG. 1 is provided as depicting a partial cross-sectional view of a tire having a tread of a cap/base construction where the outer tread cap layer is presented with two primary tread cap zones together with two lateral and one optional central supplemental tread cap zones of graduated physical properties.

FIG. 1 represents a partial cross-section of a tire (1) having a tread (2) comprised of an outer tread cap layer (3) having a running surface (4) intended to be ground-contacting and underlying tread base layer (5) as a transition zone between said tread cap layer (3) and tire carcass (6) which may include a rubber encapsulated belt layer (7); two spaced apart relatively inextensible beads (not shown) to accommodate mounting the tire on a rigid rim (not shown), carcass plies as rubber encapsulated fabric reinforced plies (8) extending between said beads through a crown region of the tire (1), a pair of partially shown sidewalls (9) individually extending between said beads and outer, peripheral edges of said tread (2) and a rubber innerliner layer (10).

Said tread cap layer (3) is comprised of five circumferential longitudinal zones of rubber compositions of graduated physical properties. Said tread cap zones extend from the outer running surface (4) of the tread cap layer (3) radially inward to the underlying rubber tread base layer (5) which does not contain the aforesaid zones of the tread cap zones.

Said zones of said tread cap layer (3) are comprised of a supplemental central zone (11) centered over the centerline, or equatorial plane (EP), of the tire and positioned between two individual primary tread cap zones (12) and two supplemental lateral tread cap zones (13) individually positioned axially outward from a primary tread cap zone (12).

The central tread cap zone (11) spans about 16 percent of the total running surface (4) of the tire tread cap layer (3), which includes the spaces (14) across the openings of any included grooves, including the circumferential grooves (15). The primary tread cap zones (12) are each individually of substantially the same width and collectively span about 66 percent of the said total running surface (4) of the tire tread cap layer (3). The lateral tread cap zones (13) are each individually of substantially the same width and collectively span about 18 percent of the said total running surface (4) of the tread cap layer (3).

Divisional junctions (16) are provided between the supplemental central tread cap zone (11) and the primary tread cap zones (12) which are located within the circumferential grooves (15). The primary tread cap zones (12) join the lateral tread cap zones at a junction (17) which is located axially outward of the span of the free rolling tire footprint (18) as illustrated in FIG. 2. Thereby, the lateral tread cap zones (and a portion of the primary tread cap zones) are intended to be ground-contacting primarily only under tire cornering conditions rather under tire free rolling conditions. Such aspect is desirable because such lateral tread cap zones physically present a benefit of improved grip for the tire tread running surface under cornering conditions yet are intended to be only intermittently ground-contacting because of their potentially different tread wear resistance relative to said adjoining primary tread cap zones.

For the drawing, the graduated dynamic storage moduli (G') at −25° C., 3 percent strain and 10 Hertz for the rubber tread cap central zone (11), rubber primary tread cap zones (12) and rubber lateral tread cap zones (13) are presented as being 21.9 MPa, 29.2 MPa and 42.6 MPa, respectively.

For the drawing, the varied dynamic storage moduli (G') at 60° C., 3 percent strain and 10 Hertz for the rubber tread cap central zone (11), rubber primary tread cap zones (12) and rubber lateral tread cap zones (13) are presented as being 3.6 MPa, 2.9 MPa and 3.7 MPa, respectively.

For the drawing, the graduated dynamic loss moduli (G') at 0° C., 3 percent strain and 10 Hertz for the rubber tread cap central zone (11), rubber primary tread cap zones (12) and rubber lateral tread cap zones (13) are presented as being 2.8 MPa, 2.9 MPa and 5.2 MPa, respectively.

FIG 1A is a duplicate of FIG. 1 except that the tread cap (3) is presented as an asymmetrically zoned tread cap configuration. In particular, the width of the primary tread cap zone (12) presented on the right side of the tread cap in FIG aA is increased to about 38 percent of the total running surface of the tread cap and therefore has a greater width than the corresponding primary tread cap zone (12) of the left side of the tread cap. The width of the central tread cap zone (11) is thereby reduced to about 11 percent of the total running surface of the tread cap.

FIG 1B is a duplicate of FIG. 1 except that the tread cap is presented as an asymmetrically zoned tread cap configuration. In particular, the lateral tread cap zone (13) on the right side of the tread cap (3) of FIG. 1 has been eliminated so that the width of the primary tread cap zone (12) has been increased to include the portion of the tread cap formerly occupied by the eliminated lateral tread cap zone and thereby individually spans about 42 percent of the total running surface of the tread cap.

FIG 1C is a duplicate of FIG. 1 except that the lateral tread cap zones (13) have eliminated and the central tread cap zone (11) retained so that the width of the primary tread cap zones (12) have been increased to include the portion of the tread cap formerly occupied by the eliminated lateral tread cap zones.

FIG. 2 is a representation of partial longitudinal footprint (20) of the tire tread (1) of FIG. 1. The span (18) of the free rolling footprint (20) represents the axial width of the free rolling footprint without the extended portions (21) with the span (19) including the extended portions (21). The extended portions (21) are intended to represent the contact area created by the axially outward portion of the total running surface of the tread cap under tire cornering conditions. The free rolling footprint is intended to represent the rolling footprint of the tire operating under 75 percent of its standard load in which the running surfaces of the lateral tread cap zones (13) of the tire tread (1) of FIG. 1 are not in contact with the ground and therefore not a part of the free rolling footprint. Under cornering conditions, it intended that at least a portion of the running surfaces of one of the lateral tread cap zones (13) comes in contact with the ground to thereby present at least a portion of an axially extended footprint portion (21) to the road and thereby provides increased grip for the tire tread.

FIG. 3 is a graphical presentation a temperature sweep of dynamic storage modulus (G') over temperature range of from −30° C. to +60° C. with Relative G' values reported as being relative to a normalized value of 100 for the G' value for the supplemental lateral zone rubber composition at −30° C. The G' temperature sweep was conducted according to the hereinbefore discussed ARES™-LS2 rheometer methodology. For the graphical presentation, G' versus temperature curves are presented for the rubber compositions of the primary tread cap zone and the supplemental central and lateral tread cap zones. Observation points are indicated at −25° C. and at +60° C. for the respective relative G' values at those temperatures on the depicted temperature sweep graph.

In FIG. 3, it can be seen that while the normalized representative storage modulus (G') at −25° C. of the rubber composition for the supplemental central (center) tread cap zone is lower than the comparative representative normalized G' of the rubber composition of the primary tread cap zone, the presented normalized storage modulus G' of the representative rubber composition of the central tread cap zone becomes greater than the G' of the rubber composition of the primary tread cap zone at 60° C. This can phenomenon can be seen in FIG. 3 as the representative −25° C. G' and 60° C. G' curves observed to cross rather to continue in a parallel configuration to each over the observed temperature sweep range. Therefore, it is important to appreciate that in one aspect, a crossover was observed for the G' curves of the representative central and primary zone rubber compositions (compositions illustrated in Example I) significantly below a temperature sweep temperature of 60° C. and well above a temperature sweep temperature of −25° C.

Figure 4:
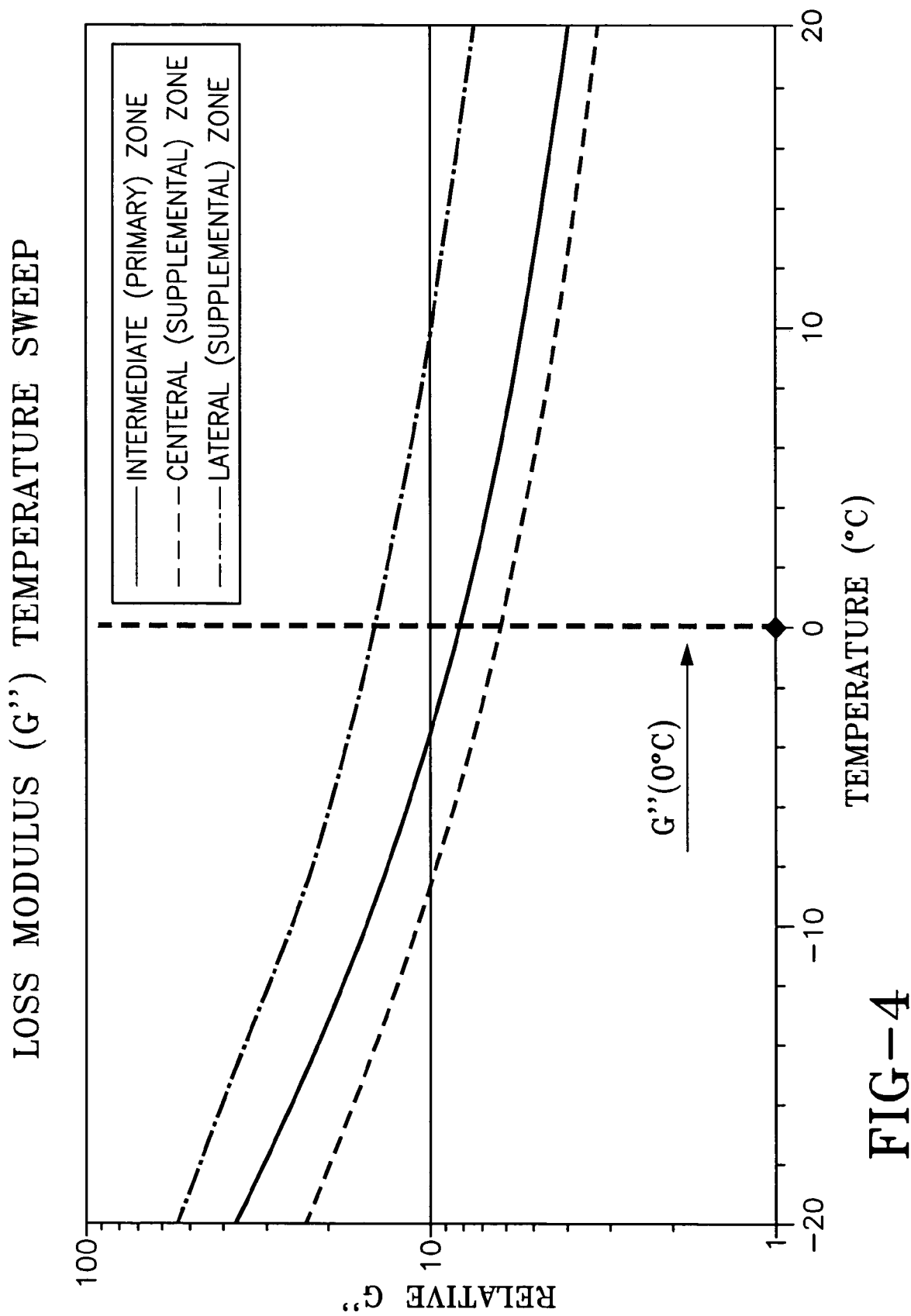

FIG. 4 is a graphical presentation a temperature sweep of dynamic loss modulus (G') over temperature range of from −20° C. to +20° C. with Relative G' values reported as being relative to a normalized value of 100 for the G" value for the lateral zone rubber composition at −30° C. which is off the scale of the graph of FIG. 4. The G" temperature sweep was conducted according to the hereinbefore discussed ARES™-LS2 rheometer methodology. For the graphical presentation, G" versus temperature curves are presented for the rubber compositions (rubber compositions shown in Example I) of the primary tread cap zone(s) and the supplemental central and lateral tread cap zones. An observation point is indicated at 0° C. for the respective relative G" values at that temperatures on the depicted temperature sweep graph.

In FIG. 4, it can be seen that the normalized representative loss modulus (G") at 0° C. of the rubber composition for the supplemental lateral tread cap zones is significantly greater than the comparative representative normalized G" of the rubber composition of the primary tread cap zone.

In the practice of this invention, the synthetic amorphous silica (e.g. precipitated silica) may be composed of aggregates of precipitated silica, which is intended to include precipitated aluminosilicates as co-precipitated silica and aluminum.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm$^3$/100 g, and more usually about 100 to about 300 cm$^3$/100 g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from J. M. Huber Corporation as, for example, Zeopol 8745 and Zeopol 8715, silicas from Degussa A G with, for example, designations VN2, VN3 and Ultrasil 7005 as well as other grades of silica, particularly precipitated silicas, which can be used for elastomer reinforcement.

A coupling agent is utilized with the silica to aid in its reinforcement of the rubber composition which contains the silica. Such coupling agent conventionally contains a moiety reactive with hydroxyl groups on the silica (e.g. precipitated silica) and another and different moiety interactive with the diene hydrocarbon based elastomer.

In practice, said coupling agent may be, for example, (A) a bis-(3-triethoxysilylpropyl) polysulfide having an average of from 2 to about 4 and more preferably an average of from 2 to about 2.6 or from about 3.4 to about 4, connecting sulfur atoms in its polysulfidic bridge, or (B) a bis-(3-triethoxysilylpropyl) polysulfide having an average of from about 2 to about 2.6 connecting sulfur atoms in its polysulfidic bridge and a bis-(3-triethoxysilylpropyl) polysulfide having an average of from about 3.4 to about 4 connecting sulfur atoms in its polysulfidic bridge, wherein said polysulfide having an average of from 2 to about 2.6 connecting sulfur atoms in its polysulfidic bridge (to the exclusion of such polysulfide having an average of from 3 to 4 connecting sulfur atoms in its polysulfidic bridge) is blended with said rubber composition in the absence of sulfur and sulfur vulcanization accelerator and wherein said polysulfide having an average of from about 3.4 to about 4 connecting sulfur atoms in its polysulfidic bridge is thereafter blended with said rubber composition in the presence of sulfur and at least one sulfur vulcanization accelerator, or (C) an organoalkoxymercaptosilane composition of the general Formula (I) represented as:

$$(X)_n(R_7O)_{3-n}\text{—Si—}R_8\text{—SH} \qquad (I)$$

wherein X is a radical selected from a halogen, namely chlorine or bromine and preferably a chlorine radical, and from alkyl radicals having from one to 16, preferably from one through 4, carbon atoms, preferably selected from methyl, ethyl, propyl (e.g. n-propyl) and butyl (e.g. n-butyl) radicals; wherein R$_7$ is an alkyl radical having from 1 through 18, alternately 1 through 4, carbon atoms preferably selected from methyl and ethyl radicals and more preferably an ethyl radical; wherein R$_8$ is an alkylene radical having from one to 16, preferably from one through 4, carbon atoms, preferably a propylene radical; and n is an average value of from zero through 3, preferably zero, and wherein, in such cases where n is zero or 1, R$_7$ may be the same or different for each (R$_7$O) moiety in the composition, or (D) said organalkoxyomercaptosilane of the general Formula (I) capped with a moiety which uncaps the organoalkoxymercaptosilane upon heating to an elevated temperature.

Representative examples various organoalkoxymercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

Such organoalkoxymercaptosilanes may be capped with various moieties as discussed above.

A representative example of a capped organoalkoxymercaptosilane coupling agent useful for this invention is a liquid 3-octanoylthio-1-propyltriethoxysilane as NXT™ Silane from the GE Silicones Company.

The coupling agent may, for example, be added directly to the elastomer mixture or may be added as a composite of precipitated silica and such coupling agent formed by treating a precipitated silica therewith or by treating a colloidal silica therewith and precipitating the resulting composite.

For example, said silica (e.g. precipitated silica), or at least a portion of said silica, may be pre-treated prior to addition to said elastomer(s):

(A) with an with an alkylsilane of the general Formula (II), or (B) with said bis(3-triethoxysilylpropyl) polysulfide having an average of from about 2 to about 4 connecting sulfur atoms in its polysulfidic bridge, or (C) with said organomercaptosilane of the general Formula (I), or (D) with a combination of said alkylsilane of general Formula (I) and said bis(3-triethoxysilylpropyl) polysulfide having an average of from about 2 to about 4 connecting sulfur atoms in its polysulfidic bridge, or (E) with a combination of said alkylsilane of general Formula (II) and said organomercaptosilane of general Formula (I);

wherein said alkylsilane of the general Formula (I) is represented as:

$$X_n\text{—Si—}R_{6(4-n)} \qquad (II)$$

wherein R$_6$ is an alkyl radical having from 1 to 18 carbon atoms, preferably from 1 through 4 carbon atoms; n is a value of from 1 through 3; X is a radical selected from the group consisting of halogens, preferably chlorine, and alkoxy groups selected from methoxy and ethoxy groups, preferably an ethoxy group.

A significant consideration for said pre-treatment of said silica is to reduce, or eliminate, evolution of alcohol in situ within the rubber composition during the mixing of the silica with said elastomer such as may be caused, for example, by reaction such coupling agent contained within the elastomer composition with hydroxyl groups (e.g. silanol groups) contained on the surface of the silica.

In practice, said rubber reinforcing carbon black for said rubber compositions of said tread cap zones are preferably relatively high reinforcing rubber reinforcing carbon blacks having an Iodine absorption value (ASTM D-1510) in a range of from about 110 to about 140 g/kg and a DBP adsorption value (ASTM D-2414) in a range of from about 100 to about 150 cc/100 g. Representative examples of such carbon blacks, according to their ASTM designations which may be found in *The Vanderbilt Rubber Handbook*, 13$^{th}$ Edition (1990) on Pages 416 and 417, are, for example, N110, N120, N121, N134, N220, N231, N234 and N299.

In practice, the invention the rubber compositions may be prepared, for example, in a sequential series of at least two separate and individual preparatory internal rubber mixing steps, or stages, in which the diene-based elastomer is first mixed with the prescribed carbon black and/or silica in a subsequent, separate mixing step and followed by a final mixing step where curatives are blended at a lower temperature and for a substantially shorter period of time.

It is conventionally required after each mixing step that the rubber mixture is actually removed from the rubber mixer and cooled to a temperature of less than 40° C. and, for example, in a range of about 40° C. to about 20° C. and then added back to an internal rubber mixer for the next sequential mixing step, or stage.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

It is readily understood by those having skill in the art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. A primary accelerator(s) may be used, for example, in an amount ranging from about 0.5 to about 5, alternately about 0.8 to about 4, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a secondary accelerator is used, it may be, for example, be a guanidine, dithiocarbamate or thiuram compound.

The mixing of the rubber composition can, for example, be accomplished by the aforesaid sequential mixing process. For example, the ingredients may be mixed in at least one sequential non-productive (preparatory) mixing stage followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

EXAMPLE I

Samples of rubber compositions were prepared for central, primary and lateral tread cap zone(s) of a circumferentially zoned tread cap layer of a tire tread of cap/base construction.

The rubber samples are referred to in this Example as Sample A (for a rubber composition for a supplemental central tread cap zone), Sample B (for a rubber composition for a primary tread cap zone) and Sample C (for a rubber composition for a supplemental lateral tread cap zone).

The rubber compositions were prepared in an internal rubber mixer using several mixing stages, namely, three individual sequential non-productive mix stages, in which ingredients are mixed and blended, except for sulfur curative and vulcanization accelerator(s), for about 5 to 6 minutes to a temperature of about 150 to 170° C., depending somewhat upon the mixing stage and the rubber mixture being mixed, dumped from the mixer, sheeted out and allowed to cool to below 40° C. between non-productive mixing stages and following the last non-productive mixing stage.

The resulting rubber composition is then mixed in a productive mixing stage in an internal rubber mixer, in which sulfur curative and accelerators are added, for between about 1 and 3 minutes to a temperature of between about 100 and 120° C., depending somewhat upon the rubber mixture being mixed.

Mixing rubber compositions in a series of individual and sequential non-productive and productive mixing stages is well known to those having skill in such art.

Ingredients used in the rubber Samples are illustrated in the following Table 1.

TABLE 1

| Material | Central Zone Sample A | Primary Zone Sample B | Lateral Zone Sample C |
|---|---|---|---|
| Non-Productive Mix Stages | | | |
| Styrene/butadiene rubber[1] | 58 | 68 | 70 |
| Polybutadiene rubber[2] | 42 | 32 | 30 |
| Carbon black (N120)[3] | 10 | 25 | 60 |
| Silica[4] | 75 | 60 | 30 |
| Coupling agent[5] | 6.5 | 5.2 | 2.6 |
| Rubber aromatic processing oils[6] | 26.8 | 28.5 | 36.3 |
| Zinc oxide | 2.5 | 2.5 | 2.5 |
| Fatty acid[7] | 2 | 2 | 2 |
| Antidegradant[8] | 2 | 2 | 2 |
| Particulate aluminum silicate (pumice) | 2 | 0 | 0 |
| Short glass fibers | 6 | 0 | 0 |
| Productive Mix Stage | | | |
| Sulfur | 1 | 1 | 1 |
| Accelerator(s)[9] | 5 | 4 | 4 |

[1]Styrene/butadiene copolymer elastomer, organic solvent solution polymerization prepared containing about 13 percent bound styrene, having about 22 percent vinyl content based upon the total elastomer and having a Tg of about −36° C. obtained from The Goodyear Tire & Rubber Company which contained about 37.5 parts by weight extender oil per 100 parts by weight of the elastomer and is reported on a dry weight basis (without the extender oil) in Table 1.
[2]Cis 1,4-polybutadiene rubber obtained by organic solvent solution polymerization having a cis 1,4-content of greater than 95 percent and a Tg of about −105° C. obtained as Budene 1208 from The Goodyear Tire & Rubber Company
[3]N-120 carbon black, an ASTM designation
[4]Synthetic, amorphous, precipitated silica obtained as Zeosil 1165MP from the Rhodia Company
[5]A liquid 3-octanoylthio-1-propyltriethoxysilane as NXT ™ Silane from the GE Silicones Company
[6]Aromatic rubber processing oil (free oil) plus the oil contained in the oil extended styrene/butadiene elastomer
[7]Primarily stearic acid
[8]Of the paraphenylene diamine type
[9]N-tert butyl-2-benzothiazyl sulfenamide and diphenyl guanidine Various physical properties for rubber Samples of Table 1 are reported in the following Table 2. The Samples were cured at a temperature of about 160° C. for about 14 minutes.

TABLE 2

| | Central Zone Sample A | Primary Zone Sample B | Lateral Zone Sample C |
|---|---|---|---|
| 300% modulus (ring) (MPa) | 8.1 | 8.0 | 8.5 |
| Ultimate tensile strength (MPa) | 14.6 | 16.7 | 16.5 |
| Ultimate elongation (%) | 473 | 528 | 535 |
| Shore A hardness (23° C.) | 70 | 67 | 70 |
| Zwick Rebound (23° C.) | 39 | 36 | 28 |
| T90 (minutes) (at 160° C.)[1] | 5.4 | 5.7 | 5.7 |
| Dynamic storage modulus (G')[2], (−25° C.), MPa | 21.9 | 29.2 | 42.6 |
| Dynamic storage modulus (G')[2] (60° C.), MPa | 3.6 | 2.9 | 3.7 |
| Dynamic loss modulus (G")[2], (0° C.), MPa | 2.8 | 2.9 | 5.2 |

[1]Determined by a Moving Die Rheometer as model MDR-2000TM by Alpha Technologies using a cure temperature of about 160° C.
[2]Observed from a temperature versus viscoelastic property sweep as hereinbefore described with said ARES ™-LS2 rheometer operated at a 3 percent torsional strain and 10 Hertz frequency, the methodology of which is hereinbefore discussed.

From Table 2 it can be seen that a graduated storage modulus (G') at −25° C. is presented for the Samples ranging from a low of 21.9 MPa for Sample A to a higher value of 42.6 MPa for Sample C.

In particular, the storage modulus (G') at −25° C. of Sample A (rubber sample for a central tire cap zone) is significantly lower than the G' at −25° C. for Sample B (rubber composition for a primary tread cap zone).

From Table 2 it can be seen that a varied storage modulus (G') at 60° C. is presented for the Samples, namely values of 3.6, 2.9 and 3.7 MPa for Samples A, B, and C, respectively.

In particular, the storage moduli (G') at 60° C. of both Sample A (rubber composition for a central tread cap zone) and Sample C (rubber composition for a lateral tread cap zone) are higher than the storage modulus (G') at 60° C. of Sample B (rubber composition for a primary tread cap zone).

From Table 2 it can be seen that a varied loss modulus (G') at 0° C. is presented for the Samples, ranging from a low of 2.8 MPa for Sample A to a higher value of 5.2 MPa for Sample C.

In particular, the dynamic loss modulus (G') at 0° C. of the Sample C (rubber composition for a lateral tread cap zone) is higher than such loss modulus (G') for Sample B (rubber composition for a primary tread cap zone).

EXAMPLE II

A tire of size P225/60R16 was prepared having a tread of a cap/base construction with the tread cap layer providing a running surface of the tire and composed of a plurality of circumferential longitudinal zones in a manner similar to FIG. 1.

The supplemental central tread cap zone was centered upon the centerline of the tire and was positioned between two primary tread cap zones where the central and primary tread cap zones were joined in a circumferential longitudinal grooves positioned between said central and primary tread cap zones. Axially outward of each of the primary tread cap zones are positioned a supplemental lateral tread cap zone.

In this manner, the primary tread cap zones are intermediate tread cap zones in a sense of being located in an intermediate position between said supplemental central and said supplemental lateral tread cap zones.

The primary tread cap zones join the lateral tread cap zones axially outward of the free rolling footprint of the tire tread. The free rolling footprint is presented for the tire when it the tire is inflated to a pressure of about 35 psi and at load of 75 percent of its Standard Load reported in the aforesaid handbook of the Tire and Rim Association.

Accordingly, the running surface of the lateral tread cap zones are therefore axially outward of the free rolling footprint of the tread and therefore are designed to be intermittently ground contacting upon cornering the tires to thereby provide extra grip for the tire under cornering conditions.

The central tread cap width spanned about 16 percent of total running surface of the tire tread.

The primary (intermediate) tread cap zones were of equal widths and together spanned about 66 percent of the total running surface of the tire tread.

The lateral tread cap zones were of equal widths and together spanned about 18 percent of the total running surface of the tire tread.

The central, primary and lateral tread cap zone rubber compositions were of rubber compositions represented by Samples A, B and C, respectively, of Example I.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a rubber tread of a cap/base construction comprised of an outer rubber tread cap layer containing an outer running surface and an underlying rubber tread base layer, wherein said tread cap layer is comprised of a plurality of circumferential, longitudinal rubber tread cap zones of graduated physical properties, wherein said tread cap zones individually extend from said tread cap running surface radially inward to said tread base layer:

wherein said tread cap zones are comprised of two primary tread cap zones, one central tread cap zone and two lateral tread cap; wherein said central tread cap zone is positioned between said primary tread cap zones and spans at least 5 percent of the total running surface of the tread cap layer, wherein said primary tread cap zones are of substantially equal widths and collectively span at least 50 percent of the total running surface of the tread cap layer, wherein said lateral tread cap zones are of substantially equal widths, span at least 5 percent of the total running surface of the tread cap layer and are individually positioned axially outward from said primary tread cap zone, wherein, said individual rubber tread cap zones are characterized by:

(A) viscoelastic properties comprised of:
  (1) a dynamic storage modulus (G') at 60° C., 3 percent strain and 10 Hertz of said lateral tread cap lateral zones at least 0.5 MPa greater than such storage modulus (G') at 60° C. of said primary tread cap zones and such storage modulus (G') at 60° C. of said central tread cap zone is at least 0.5 Mpa greater than such storage modulus (G') at 60° C. of said primary tread cap zones; and
  (2) a dynamic storage modulus (G') at −25° C., 3 percent strain and 10 Hertz of said central tread cap zone at least 5 MPa less than such storage modulus (G') at −25° C. of said primary tread cap zones; and
  (3) the dynamic loss modulus (G") at 0° C., 3 percent strain and 10 Hertz of said lateral tread cap zones at least 1 MPa greater than such loss modulus (G") at 0° C. of said primary tread cap zones; or (B) viscoelastic properties comprised of:
  (1) a dynamic storage modulus (G') at 60° C., 3 percent strain and 10 Hertz for said primary tread cap zones in a range of from about 0.5 to about 5 MPa, such storage modulus (G'), (at 60° C.), for said central tread cap zone in a range of from about 1 to about 6 MPa and such storage modulus (G'), (at 60° C.), for said lateral tread cap zones in a range of from about 1 to about 6 MPa; provided however that such storage modulus (G') (at 60° C.) of said lateral tread cap zones and said central tread cap zone is greater than such storage modulus (G') (at 60° C.) of said primary tread cap zones; and
  (2) a dynamic storage modulus (G') at −25° C., 3 percent strain and 10 Hertz for said primary tread cap zones in a range of from about 10 to about 300 MPa, such storage modulus (G'), (at −25° C.), for said central tread cap zone in a range of from about 2 to about 295 MPa and such storage modulus (G'), (at −25° C.), of said lateral tread cap zones in a range of from about 10 to about 350 MPa; provided however that such storage modulus (G'), (at −25° C.) of said central tread cap zone is less than such storage modulus (G'), (at −25° C.) of said primary tread cap zones and
  (3) a dynamic loss modulus (G") at 0° C., 3 percent strain and 10 Hertz for said primary tread cap zones in a range of from about 0.5 to about 20 MPa, such loss modulus (G"), (at 0° C.), for said central tread cap zone in a range of from about 0.5 to about 20 MPa such loss modulus(G"), (at 0° C.), for said lateral tread cap zones in a range of from about 1.5 to about 30 MPa; provided however that such loss modulus (G"), (at 0° C.), of the rubber composition of said lateral tread cap zones is greater than such loss modulus (G"), (at 0° C.), of said primary tread cap zones or (C) viscoelastic properties comprised of:
  (1) dynamic storage modulus (G') at 60° C., 3 percent strain and 10 Hertz for said primary tread cap zones in a range of from about 0.5 to about 2 MPa, such storage modulus (G'), (at 60° C.), for said central tread cap zone in a range of from about 1 to about 3 MPa and such storage modulus (G') (at 60° C.) for said lateral tread cap zones in a range of from about 1 to about 3 MPa; provided however that the storage modulus (G'), (at 60° C.), of said lateral tread cap zones is at least 0.5 MPa greater than such storage modulus (G'), (at 60° C.), of the primary and central tread cap zones and the storage modulus (G'), (at 60° C.), of said central tread cap zone is at least 0.5 MPa greater than such storage modulus (G'), (at 60° C.), of the primary tread cap zones;
  (2) a dynamic storage modulus (G') at −25° C., 3 percent strain and 10 Hertz for said primary tread cap zones in a range of from about 10 to about 300 MPa, such storage modulus (G'), (at −25° C.), for said central tread cap zone in a range of from about 2 to about 295 MPa and such storage modulus (G'), (at −25° C.), for said lateral tread cap zones in a range of from about 10 to about 50 MPa; provided however that such storage modulus (G'), (at −25° C.), of the rubber composition of said central tread cap zone is at least 5 MPa less than such storage modulus (G'), ( at −25° C.), of the primary tread cap zones and
  (3) a dynamic loss modulus (G") at 0° C., 3 percent strain and 10 Hertz of said primary tread cap zones in a range of from about 0.5 to about 3 MPa, such loss modulus (G"), (at 0° C.), for said central tread cap zone in a range of from about 0.5 to about 3 MPa and such loss modulus (G"), (at 0° C.), for said lateral tread cap zones in a range of from about 1.5 to about 4 MPa; provided however that such loss modulus (G"), (at 0° C.), of said lateral tread cap zones is at least 1 MPa greater than such loss modulus (G"), (at 0° C.), of said primary tread cap zones, or (D) viscoelastic properties comprised of:
  (1) a dynamic storage modulus (G') at 60° C., 3 percent strain and 10 Hertz for said primary tread cap zones in a range of from about 1.5 to about 4 MPa, such storage modulus (G'), (at 60° C.), for said central tread cap zone in a range of from about 2 to about 5 MPa and such storage modulus (G'), (at 60° C.), for said lateral tread cap zones in a range of from about 2 to about 5 MPa; provided however that the storage modulus (G'), (at 60° C.), of said lateral tread cap zones is at least 0.5 MPa greater than such storage modulus (G'), (at 60° C.), of said primary tread cap zones and such storage modulus (G'), (at 60° C.), of said central tread cap zone is at least 0.5 MPa greater than such storage modulus (G'), (at 60° C.), of said primary tread cap zones;
  (2) a dynamic storage modulus (G') at −25° C., 3 percent strain and 10 Hertz for said primary tread cap zones in a range of from about 20 to about 50 MPa, such storage modulus (G'), (at −25° C.), for said central tread cap zone in a range of from about 5 to about 45 MPa and such storage modulus (G'), (at −25° C.), for said lateral tread cap zones in a range of from about 20 to about 100 MPa; provided however that such storage modulus (G'), (at −25° C.), of said central tread cap zone is at least 5 MPa less than such storage modulus (G'), (at −25° C.), of said primary tread cap zones and (3) a dynamic loss modulus (G") at 0° C., 3 percent strain and 10 Hertz for said primary tread cap zones in a range of from about 1 to about 4 MPa, such loss modulus (G"), (at 0° C.), for said central tread cap zone in a range of from about 1 to about 4 MPa and such loss modulus (G"), (at 0° C.), for said lateral tread cap zones in a range of from about 2 to about 15 MPa; provided however that such loss modulus (G"), (at 0° C.), of said lateral tread cap zones is at least 1 MPa greater than such loss modulus (G"), (at 0° C.), of said primary tread cap zones, or (E) viscoelastic properties comprised of:

(1) a dynamic storage modulus (G') at 60° C., 3 percent strain and 10 Hertz for said primary tread cap zones in a range of from about 2 to about 5 MPa, such storage modulus (G'), (at 60° C.), for said central tread cap zone in a range of from about 2.5 to about 6 MPa and such storage modulus (G'), (at 60° C.), for said lateral tread cap zones in a range of from about 2.5 to about 6 MPa; provided however that the storage modulus (G'), (at 60° C.), of said lateral tread cap zones is at least 0.5 MPa greater than such storage modulus (G'), (at 60° C.), of said primary tread cap zones and such storage modulus (G'), (at 60° C.), of the rubber composition of said central tread cap zone is at least 0.5 Mpa greater than such storage modulus (G'), (at 60° C.), of said primary tread cap zones;

(2) a dynamic storage modulus (G') at −25° C., 3 percent strain and 10 Hertz for said primary tread cap zones in a range of from about 35 to about 300 MPa, such storage modulus (G'), (at −25° C.), for said central tread cap zone in a range of from about 30 to about 295 MPa and such storage modulus (G'), (at −25° C.), for said lateral tread cap zones in a range of from about 35 to about 350 MPa; provided however that such storage modulus (G'), (at −25° C.), of said central tread cap zone is at least 5 MPa less than such storage modulus (G'), ( at −25° C.), of said primary tread cap zones; and (3) a dynamic loss modulus (G") at 0° C., 3 percent strain and 10 Hertz for said primary tread cap zones in a range of from about 2 to about 20 MPa, such loss modulus (G"), at 0° C., for said central tread cap zone in a range of from about 2 to about 20 MPa and such loss modulus (G"), (at 0° C.), for said lateral tread cap zones in a range of from about 3 to about 30 MPa; provided however that such loss modulus (G"), (at 0° C.), of said lateral tread cap zones is at least 1 MPa greater than such loss modulus (G"), (at 0° C.), of said primary tread cap zones, and wherein the running surface of said lateral tread cap zones is positioned axially outward of the free rolling footprint of the tire when inflated and running under 75 percent of its rated load and are thereby intended to be ground-contacting only under cornering conditions.

2. The tire of claim 1 wherein the viscoelastic properties of said individual rubber tread cap zones are comprised of:

(A) a dynamic storage modulus (G') at 60° C., 3 percent strain and 10 Hertz of said lateral tread cap lateral zones is at least 0.5 MPa greater than such storage modulus (G') at 60° C. of said primary tread cap zones and such storage modulus (G') at 60° C. of said central tread cap zone is at least 0.5 MPa greater than such storage modulus (G') at 60° C. of said primary tread cap zones; and (B) a dynamic storage modulus (G') at −25° C., 3 percent strain and 10 Hertz of said central tread cap zone is at least 5 MPa less than such storage modulus (G') at −25° C. of said primary tread cap zones; and (C) a dynamic loss modulus (G") at 0° C, 3 percent strain and 10 Hertz of said lateral tread cap zones is at least 1 MPa greater than such loss modulus (G") at 0° C. of said primary tread cap zones.

3. The tire of claim 1 wherein the viscoelastic properties of said individual rubber tread cap zones are comprised of:

(A) a dynamic storage modulus (G') at 60° C, 3 percent strain and 10 Hertz for said primary tread cap zones in a range of from about 0.5 to about 5 MPa, such storage modulus (G'), (at 60° C.), for said central tread cap zone in a range of from about 1 to about 6 MPa and such storage modulus (G'), (at 60° C.), for said lateral tread cap zones in a range of from about 1 to about 6 MPa; provided however that such storage modulus (G') (at 60° C.) of said lateral tread cap zones and said central tread cap zone is greater than such storage modulus (G') (at 60° C.) of said primary tread cap zones; and (B) a dynamic storage modulus (G') at −25° C., 3 percent strain and 10 Hertz for said primary tread cap zones in a range of from about 10 to about 300 MPa, such storage modulus (G'), (at −25° C.), for said central tread cap zone in a range of from about 2 to about 295 MPa and such storage modulus (G'), (at −25° C.), of said lateral tread cap zones in a range of from about 10 to about 350 MPa; provided however that such storage modulus (G'), (at −25° C.) of said central tread cap zone is less than such storage modulus (G'), (at −25° C.) of said primary tread cap zones; and (C) a dynamic loss modulus (G") at 0° C., 3 percent strain and 10 Hertz for said primary tread cap zones in a range of from about 0.5 to about 20 MPa, such loss modulus (G"), (at 0° C.), for said central tread cap zone in a range of from about 0.5 to about 20 MPa such loss modulus (G"), (at 0° C.), for said lateral tread cap zones in a range of from about 1.5 to about 30 MPa; provided however that such loss modulus (G"), (at 0° C.), of the rubber composition of said lateral tread cap zones is greater than such loss modulus (G"), (at 0° C.), of said primary tread cap zones.

4. The tire of claim 1 wherein the viscoelastic properties of said individual rubber tread cap zones are comprised of:

(A) dynamic storage modulus (G') at 60° C., 3 percent strain and 10 Hertz for said primary tread cap zones in a range of from about 0.5 to about 2 MPa, such storage modulus (G'), (at 60° C.), for said central tread cap zone in a range of from about 1 to about 3 MPa and such storage modulus (G') (at 60° C.) for said lateral tread cap zones in a range of from about 1 to about 3 MPa; provided however that the storage modulus (G'), (at 60° C.), of said lateral tread cap zones is at least 0.5 MPa greater than such storage modulus (G'), (at 60° C.), of the primary and central tread cap zones and the storage modulus (G'), (at 60° C.), of said central tread cap zone is at least 0.5 MPa greater than such storage modulus (G'), (at 60° C.), of the primary tread cap zones;

(B) a dynamic storage modulus (G') at −25° C., 3 percent strain and 10 Hertz for said primary tread cap zones in a range of from about 10 to about 30 MPa, such storage modulus (G'), (at −25° C.), for said central tread cap zone in a range of from about 2 to about 25 MPa and such storage modulus (G'), (at −25° C.), for said lateral tread cap zones in a range of from about 10 to about 50 MPa; provided however that such storage modulus (G'), (at −25° C.), of the rubber composition of said central tread cap zone is at least 5 MPa greater than such storage modulus (G'), ( at −25° C.), of the primary tread cap zones; and (C) a dynamic loss modulus (G") at 0C., 3 percent strain and 10 Hertz of said primary tread cap zones in a range of from about 0.5 to about 3 MPa, such loss modulus (G"), (at 0° C.), for said central tread cap zone in a range of from about 0.5 to about 3 MPa and such loss modulus (G"), (at 0° C.), for said lateral tread cap zones in a range of from about 1.5 to about 4 MPa; provided however that such loss modulus (G"), (at 0° C.), of said lateral tread cap zones is at least 1 MPa greater than such loss modulus (G"), (at 0° C.), of said primary tread cap zones.

5. The tire of claim 1 wherein the viscoelastic properties of said individual rubber tread cap zones are comprised of:
(A) a dynamic storage modulus (G') at 60° C., 3 percent strain and 10 Hertz for said primary tread cap zones in a range of from about 1.5 to about 4 MPa, such storage modulus (G'), (at 60° C), for said central tread cap zone in a range of from about 2 to about 5 MPa and such storage modulus (G'), (at 60° C.), for said lateral tread cap zones in a range of from about 2 to about 5 MPa; provided however that the storage modulus (G'), (at 60° C.), of said lateral tread cap zones is at least 0.5 MPa greater than such storage modulus (G'), (at 60° C.), of said primary tread cap zones and such storage modulus (G'), (at 60° C.), of said central tread cap zone is at least 0.5 MPa greater than such storage modulus (G'), (at 60° C.), of said primary tread cap zones;
(B) a dynamic storage modulus (G') at −25° C., 3 percent strain and 10 Hertz for said primary tread cap zones in a range of from about 20 to about 50 MPa, such storage modulus (G'), (at −25° C.), for said central tread cap zone in a range of from about 5 to about 45 MPa and such storage modulus (G'), (at −25° C.), for said lateral tread cap zones in a range of from about 20 to about 100 MPa; provided however that such storage modulus (G'), (at −25° C.), of said central tread cap zone is at least 5 MPa less than such storage modulus (G'), (at −25° C.), of said primary tread cap zones; and
(C) a dynamic loss modulus (G") at 0° C., 3 percent strain and 10 Hertz for said primary tread cap zones in a range of from about 1 to about 4 MPa, such loss modulus (G"), (at 0° C.), for said central tread cap zone in a range of from about 1 to about 4 MPa and such loss modulus (G"), (at 0° C.), for said lateral tread cap zones in a range of from about 2 to about 15 MPa; provided however that such loss modulus (G"), (at 0° C), of said lateral tread cap zones is at least 1 MPa greater than such loss modulus (G"), (at 0° C.), of said primary tread cap zones.

6. The tire of claim 1 wherein the viscoelastic properties of said individual rubber tread cap zones are comprised of:
(A) a dynamic storage modulus (G') at 60° C., 3 percent strain and 10 Hertz for said primary tread cap zones in a range of from about 2 to about 5 MPa, such storage modulus (G'), (at 60° C.), for said central tread cap zone in a range of from about 2.5 to about 6 MPa and such storage modulus (G'), (at 60° C), for said lateral tread cap zones in a range of from about 2.5 to about 6 MPa; provided however that the storage modulus (G'), (at 60° C.), of said lateral tread cap zones is at least 0.5 MPa greater than such storage modulus (G'), (at 60° C.), of said primary tread cap zones and such storage modulus (G'), (at 60° C.), of the rubber composition of said central tread cap zone is at least 0.5 MPa greater than such storage modulus (G'), (at 60° C.), of said primary tread cap zones;
(B) a dynamic storage modulus (G') at −25° C., 3 percent strain and 10 Hertz for said primary tread cap zones in a range of from about 35 to about 300 MPa, such storage modulus (G'), (at −25° C.), for said central tread cap zone in a range of from about 30 to about 295 MPa and such storage modulus (G'), (at −25° C.), for said lateral tread cap zones in a range of from about 35 to about 350 MPa; provided however that such storage modulus (G'), (at −25° C.), of said central tread cap zone is at least 5 MPa less than such storage modulus (G'), (at −25° C.), of said primary tread cap zones; and
(C) a dynamic loss modulus (G") at 0° C., 3 percent strain and 10 Hertz for said primary tread cap zones in a range of from about 2 to about 20 MPa, such loss modulus (G"), at 0° C., for said central tread cap zone in a range of from about 2 to about 20 MPa and such loss modulus (G"), (at 0° C.), for said lateral tread cap zones in a range of from about 3 to about 30 MPa; provided however that such loss modulus (G"), (at 0° C.), of said lateral tread cap zones is at least 1 MPa greater than such loss modulus (G"), (at 0° C.), of said primary tread cap zones.

7. The tire of claim 1 wherein the individual rubber compositions of the respective zones of said zoned tread cap layer, together with said base rubber layer are co-extruded together to provide an integral, extruded, tread component of the tire.

8. The tire of claim 7 wherein the junctions of said central and primary tread cap zones are positioned within circumferential longitudinal grooves located between said central and primary tread cap zones.

9. The tire of claim 1 wherein the junctions of said central and primary tread cap zones are positioned within circumferential longitudinal grooves located between said central and primary tread cap zones.

10. The tire of claim 1 wherein at least one of said tread cap zones is a rubber composition which contains from about 1 to about 15 phr of short fibers selected from at least one of glass, polyester, nylon, aramid, carbon, rayon and cotton fibers.

11. The tire of claim 10 wherein said tread cap zone is said central tread cap zone, wherein said rubber composition of said tread cap central zone contains at least one of said short fibers, and wherein said short fibers may have an average diameter in a range of from about 10 to about 50 microns and an average length in a range of from about 0.5 to about 5 mm.

12. The tire of claim 11 wherein said tread base rubber layer is comprised of cis 1,4-polyisoprene rubber which contains carbon black in a range of from about 30 to about 70 phr and from zero to about 25 phr of precipitated silica.

13. The tire of claim 1 wherein at least one of said tread cap zones is a rubber composition which contains from about 1 to about 5 phr of at least one of particulate materials as particulate inorganic granules and/or organic granules, in addition to rubber reinforcing carbon black and precipitated silica, having an average diameter in a range of from about 50 to about 200 microns.

14. The tire of claim 13 wherein said tread cap zone is said central tread cap zone and said particulate granules are selected from at least one of particulate inorganic minerals, particulate agricultural plant-derived particles, and engineered organic and inorganic polymeric particles.

15. The tire of claim 14 wherein said particulate materials are selected from at least one of ground nut shells, hollow glass spheres, nylon polymer particles, aramid polymer particles, polyester polymer particles, inorganic mineral composites, and aluminum silicate particles.

16. The tire of claim 1 wherein at least one of said tread cap zones is a rubber composition which contains from about 1 to about 15 phr of short fibers selected from at least one of glass, polyester, nylon, aramid, carbon, rayon and cotton fibers and contains from about 1 to about 5 phr of at least one of particulate inorganic granules and/or organic granules, in addition to rubber reinforcing carbon black and precipitated silica, having an average diameter in a range of from about 50 to about 200 microns.

17. The tire of claim 1 wherein said tread base rubber layer is a single rubber composition comprised of at least one conjugated diene-based elastomer.

18. The tire of claim 1 wherein, based upon parts by weight per 100 parts by weight of rubber (phr), rubber compositions of said primary tread cap zones, central tread cap zone and said lateral tread cap zones contain, provided however that such rubber compositions have the said dynamic storage moduli (G') at both −25° C. and 60° C and dynamic loss modulus (G") at 0° C viscoelastic physical properties for the respective tread cap zones,
  (A) 100 phr of at least one, alternately at least two, conjugated diene-based elastomers;
  (B) about 40 to about 100 phr of carbon black and precipitated silica reinforcement comprised of,
    (1) about zero to about 100 phr of rubber reinforcing carbon black, and
    (2) about zero to about 80 phr of precipitated silica; and
  (C) coupling agent for said silica having a moiety reactive with hydroxyl groups (e.g. silanol groups) contained on the surface of said precipitated silica another moiety interactive with diene-based elastomers.

19. The tire of claim 18 wherein said rubber compositions contain about 40 to about 90 phr of carbon black and precipitated silica reinforcement comprised of about 5 to about 80 phr of rubber reinforcing carbon black and about 10 to about 85 phr of precipitated silica.

20. The tire of claim 18 wherein said coupling agent is:
  (A) a bis-(3-triethoxysilylpropyl) polysulfide having an average of from 2 to about 4 and more preferably an average of from 2 to about 2.6 or from about 3.4 to about 4, connecting sulfur atoms in its polysulfidic bridge, or
  (B) a bis-(3-triethoxysilylpropyl) polysulfide having an average of from about 2 to about 2.6 connecting sulfur atoms in its polysulfidic bridge and a bis-(3-triethoxysilylpropyl) polysulfide having an average of from about 3.4 to about 4 connecting sulfur atoms in its polysulfidic bridge, wherein said polysulfide having an average of from 2 to about 2.6 connecting sulfur atoms in its polysulfidic bridge (to the exclusion of such polysulfide having an average of from 3 to 4 connecting sulfur atoms in its polysulfidic bridge) is blended with said rubber composition in the absence of sulfur and sulfur vulcanization accelerator and wherein said polysulfide having an average of from about 3.4 to about 4 connecting sulfur atoms in its polysulfidic bridge is thereafter blended with said rubber composition in the presence of sulfur and at least one sulfur vulcanization accelerator, or
  (C) an organoalkoxymercaptosilane composition of the general Formula (I) represented as:

$(X)_n(R_7O)_{3-n}$—Si—$R_8$—SH    (I)

wherein X is a radical selected from chlorine, bromine, and alkyl radicals having from one through 4, carbon atoms; wherein $R_7$ is an alkyl radical having from 1 through 18 carbon atoms; wherein $R_8$ is an alkylene radical having from one 1 through 4 carbon atoms; and n is an average value of from zero through 3, and wherein in such cases where n is zero or 1, $R_7$ may be the same or different for each ($R_7O$) moiety in the composition, and
  (D) said organalkoxyomercaptosilane of the general Formula (I) capped with a moiety which uncaps the organoalkoxymercaptosilane upon heating to an elevated temperature.

21. The tire of claim 20 wherein said organoalkoxymercaptosilanes are selected from triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane or tripropoxy mercaptopropyl silane.

22. The tire of claim 20 wherein said coupling agent is liquid 3-octanoylthio-1-propyltriethoxysilane.

23. The tire of claim 20 wherein said coupling agent is added directly to the elastomer mixture or added as a composite of precipitated silica and said coupling agent formed by treating a precipitated silica therewith.

24. The tire of claim 1 wherein said central rubber tread cap zone, said primary rubber tread cap zones and said lateral rubber tread cap zones so long as they present the required dynamic storage moduli (G') at −−25° C. and 60° C and dynamic loss modulus (G") at 0° C, are of rubber compositions comprised of conjugated diene-based elastomers comprised of, based upon parts by weight per parts by weight rubber (phr):
  (A) from zero to about 100 phr of styrene/butadiene copolymer elastomer having a Tg in a range of from about −80° C. to about −10° C.;
  (B) from zero to about 80 phr of cis 1,4-polybutadiene rubber having a Tg in a range of from about −95° C. to about −110° C., preferably having a cis 1,4-content of at least 95 percent; and
  (C) from zero to about 40 phr of at least one additional diene-based elastomer having a Tg in a range of from about −100° C. to about −100° C.

25. The tire of claim 24 wherein said conjugated diene-based elastomers are, based upon parts by weight per parts by weight rubber (phr):
  (A) from zero to about 100 phr of styrene/butadiene copolymer elastomer having a Tg in a range of from about −80° C. to about −10° C.;
  (B) from zero to about 80 phr of cis 1,4-polybutadiene rubber having a Tg in a range of from about −95° C. to about −110° C.; and
  (C) from zero to about 25 phr of at least one additional diene-based elastomer having a Tg in a range of from about −10° C. to about −100° C. comprised of at least one of cis 1,4-polyisoprene rubber, isoprene/butadiene rubber, trans 1,4-polybutadiene, low vinyl polybutadiene having vinyl content in a range of 5 to about 20 percent, high vinyl polybutadiene having a vinyl content in a range of from about 20 to about 90 percent, 3,4-polyisoprene, and styrene/isoprene/butadiene rubber.

26. The tire of claim 24 wherein said additional diene based elastomer is selected from at least one of cis 1,4-polyisoprene rubber, isoprene/butadiene rubber, trans 1,4-polybutadiene, low vinyl polybutadiene having vinyl content in a range of 5 to about 20 percent, high vinyl polybutadiene having a vinyl content in a range of from about 20 to about 90 percent, 3,4-polyisoprene, and styrene/isoprene/butadiene rubber.

27. The tire of claim 24 wherein said conjugated diene-based elastomers are comprised of:

(A) about 50 to about 75 phr of said styrene/butadiene elastomer, and (B) about 25 to about 50 phr of said cis 1,4-polybutadiene rubber having a cis 1,4-content of at least 95 percent.

* * * * *